United States Patent [19]

Poget

[11] 3,748,868

[45] July 31, 1973

[54] ELASTIC COUPLING

[75] Inventor: Rene Poget, 2000 Neuchatel, Switzerland

[73] Assignee: Fabrique de Machines Andre Bechler S.A., Canton of Berne, Switzerland

[22] Filed: Dec. 1, 1971

[21] Appl. No.: 203,523

[30] Foreign Application Priority Data
Dec. 8, 1970   Switzerland.................. 18156/70

[52] U.S. Cl. .................. 64/15 B, 64/12, 64/27 L
[51] Int. Cl. ............................................. F16d 3/52
[58] Field of Search ............... 64/15 B, 15 R, 27 L, 64/27 R, 12

[56] References Cited
UNITED STATES PATENTS

| | | | |
|---|---|---|---|
| 3,013,413 | 12/1961 | Luning | 64/27 L |
| 2,041,218 | 5/1936 | Taylor | 64/15 B |
| 2,114,570 | 4/1938 | Renaud | 64/15 B |
| 3,681,939 | 9/1972 | Tintnereta | 64/27 L |

FOREIGN PATENTS OR APPLICATIONS

| | | | |
|---|---|---|---|
| 412,165 | 9/1932 | Great Britain | 64/15 R |

*Primary Examiner*—Charles J. Myhre
*Assistant Examiner*—Randall Heald
*Attorney*—McNenny, Farrington, Pearne & Gordon

[57] ABSTRACT

This invention concerns an elastic coupling suitable for transmitting drive to a machine tool and comprising two series of generally radially extending spring strip elements, e.g. of spring steel laminate construction, anchor means for anchoring radially inner and outer portions of each spring strip element of each series so as to be sprung and inclined circumferentially to the radius, the spring strip elements of one series being inclined in an opposite circumferential sense to the spring strip elements of the other series and drive input and output means arranged such that drive is transmitted via the spring strip elements.

4 Claims, 11 Drawing Figures

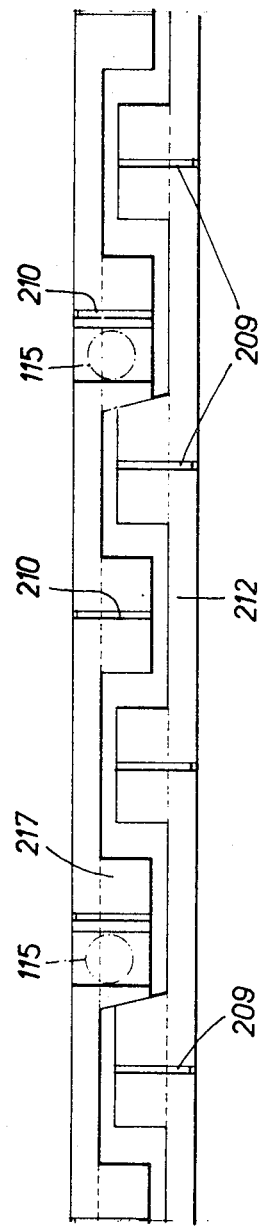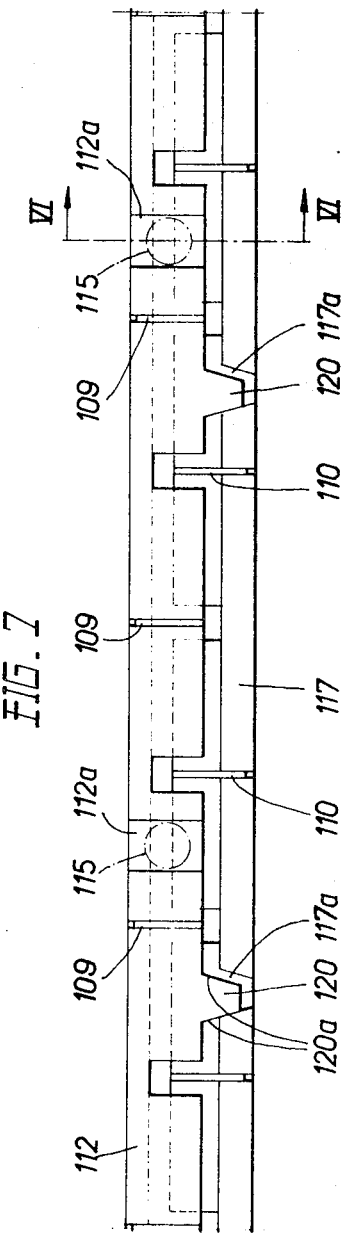

ELASTIC COUPLING

BACKGROUND OF THE INVENTION

1. FIELD OF INVENTION

The present invention relates to elastic couplings and more specifically to elastic couplings for transmitting drive to the rotatable part of a machine tool. The present invention particularly relates to elastic couplings for transmitting drive to the workpiece spindle of a lathe.

2. DESCRIPTION OF THE PRIOR ART

In different types of machine tools, especially automatic machine tools, the turnings from the workpiece in operation of the machine tool should ideally be discontinuous, i.e., they should be of many relatively short sections as opposed to a single continuous spiral which may bind itself around the tool and workpiece and interfere with the machining operation. Turnings of relatively short lengths are more easily removed and thus interfere less with the machining operation and also allow facile removal of the workpiece after it has been machined.

The formation of discontinuous discrete lengths of turnings, i.e., the division of the turnings into many short lengths, occurs according to a frequency referred to as the "turnings formation frequency," which frequency is determined by the periodic change in the cutting power during the formation of the turnings depending on the frequency of oscillation of the work tool.

The workpiece live spindle of a lathe or other machine tool has the following natural or resonance frequencies, viz:

— a natural or resonance frequency with respect to a bending vibration
— a natural or resonance frequency with respect to a torsional vibration.

The abovementioned natural or resonance frequencies are related to the critical bending turning speed and the critical torsional turning speed of the workpiece live spindle, taking into consideration primary and secondary oscillations.

Furthermore, the tool, especially the lathe cutting tool, has its own oscillation resonance frequency.

Investigation of the cutting process of a lathe and the parameters involved illustrates the importance of the agreement between the turnings formation frequency and the tool oscillation frequency, wherein the relative vibration between tool and workpiece gives the roughness of the worked surface (in axial and transverse directions of the live spindle).

Reference is now made to FIGS. 1, 2a, 2b and 2c of the accompanying drawings wherein:

FIG. 1 is a diagrammatic diametrical section through a workpiece mounted on a lathe, the lathe cutting tool being shown schematically bearing against the workpiece, FIG. 2a is a graphical representation of the cutting tool vibration, FIG. 2b is a graphical representation of the spindle or workpiece vibration, and FIG. 2c is a graphical representation of the relative vibration between the cutting tool and the spindle or workpiece.

It will be appreciated from the above that in order to design and construct a modern and accurate machine tool, the dynamic behaviour thereof must be taken into account and more specifically, the oscillatory behaviour of the spindle and tool must be considered. It will be further appreciated that the spindle and tool should be designed, dimensioned and arranged such that the natural frequencies thereof are pronouncedly different from the turnings formation frequency so as to avoid resonance phenomena leading to roughness of the worked surface. Suitable oscillation frequency of the tool may be achieved with relative ease. However, influence of the natural frequency of the spindle can only be achieved with relative difficulty by reason of the large effect of play in the bearings upon which the spindle is mounted and of the drive transmitting means to the spindle. An example of the effect of the drive transmitting means is the effect of belt tension in the case wherein drive is transmitted by means of an endless belt passing around a pulley wheel mounted on the spindle, which belt tension gives rise to an increase in the static and dynamic bending of the spindle thereby causing the natural bending frequency of the spindle to tend to and approach the turnings formation frequency. In addition to the pulley belt tension, radial oscillating distortion force is augmented by irregularities in the belt profile.

In order to avoid such pulley belt effects, it has been proposed to supply drive through the end face of the spindle. To this end, couplings have been suggested, arranged on the end of the spindle and provided with connecting elements of rubber or other similar resilient material. Such connecting elements may be stressed by bending or pressure and have certain elasticity and damping characteristics. The torque transmitted to a spindle provided with such a coupling will now be considered. It may be observed that the transmitted torque measured at the spindle chuck has a damped amplitude by reason of a damping moment related to the rubber connecting elements of the coupling. The frequency of the camping moment corresponds to the change in cutting resistance of the workpiece which is determined by the extent of division of the turnings into short sections.

The basic differential equation (with 1° of freedom) governing the torque oscillation, and showing the presence of the damping moment, is as follows viz:

$$I (d^2 \Psi/dt^2) + (c\, d\Psi/dt) + K \Psi = T_o \sin \omega t$$

wherein $I (d^2 \Psi/dt^2)$ is the torque, which depends on the moment of inertia of the mass being turned, I being the moment of inertia of the mass being turned and $d^2\Psi/dt^2$ being the angular acceleration of the said mass;

$c\, d\Psi/dt$ is the damping moment, c being the damping coefficient of the rubber connecting elements and $d\Psi/dt$ being the angular velocity of the mass being turned;

$K \Psi$ is the elastic moment, K being the elastic torsional constant of the spindle and the coupling and $\Psi$ is the angle through which the live spindle has turned during time period with respect to the drive input shaft of the coupling; and $T_o \sin \omega t$ is the torque on the input side of the coupling.

From this equation, the importance and desirability of eliminating the damping moment to achieve constant transmission of torque through the coupling will be appreciated.

SUMMARY OF THE INVENTION

The present invention provides an elastic coupling suitable for transmitting drive to a machine tool, which comprises a. two series of generally radially extending spring strip elements, b. anchor means for anchoring radially inner and outer portions of each spring strip element of each series so as to be sprung and inclined circumferentially to the radius, the spring strip elements of one series being inclined in an opposite sense to the spring strip elements of the other series, and c. drive input and output means arranged such that drive is transmitted via the spring strip elements of tend to cause a change in the inclination thereof to the radius.

Preferably, the anchor means comprises a pair of annular collars and the drive output means, one collar being adapted to anchor the radially outer portions of the spring strip elements of one series, and one collar being adapted to anchor the radially outer portions of the spring strip elements of the other series, the drive output means being adapted to anchor the radially inner portions of the spring strip elements of both series. Preferably also one collar is rotatably adjustable with respect to the other collar to allow the inclination of the spring strip elements and thus the elasticity constant of the coupling to be varied. Rotational adjustment of the collars may for example be effected by interposing rotation means between the two collars such that on moving one collar axially toward the other, the axially moved collar is also caused to rotate relatively with respect to the other.

Preferably, the spring strip elements are of spring steel laminate construction.

The elastic coupling of the present invention allows improvement in transmission of the drive torque to the spindle avoiding substantial variation therein which would otherwise lead to roughness of the worked surface. It will be observed that the coupling of the present invention operates substantially without damping and yet with satisfactory elasticity constant.

Objects and advantages will appear from the following description of embodiments and modifications of the invention, when considered in connection with the accompanying drawings, and the novel features will be particularly pointed out in the appended claims.

BRIEF DESCRIPTION OF FIGS. 3 to 9 OF THE DRAWINGS

FIG. 3 is an axial section through an elastic coupling of a first embodiment,

FIG. 4 is a section along the line IV — IV of FIG. 3 viewed from the end of the coupling shown in FIG. 3, FIG. 5 is an axial section of an elastic coupling of a second embodiment, FIG. 6 is a partial view of an axial section of the elastic coupling shown in FIG. 5 through a different axial plane to the axial section of FIG. 5, FIG. 7 is a developed view of the annular collars of the elastic coupling of the second embodiment, FIG. 8 is a partial view of an axial section of a modification of the second embodiment, and FIG. 9 is a developed view of FIG. 8.

DESCRIPTION OF THE PREFERRED EMBODIMENTS

Figure 1:
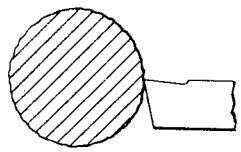
Figure 2A:
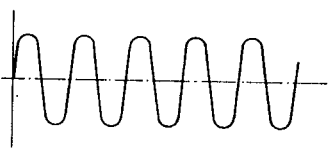
Figure 2B:
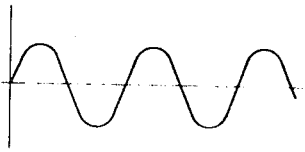
Figure 2C:
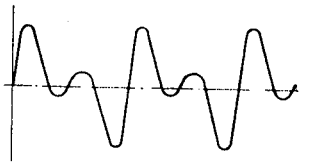
Figure 3:
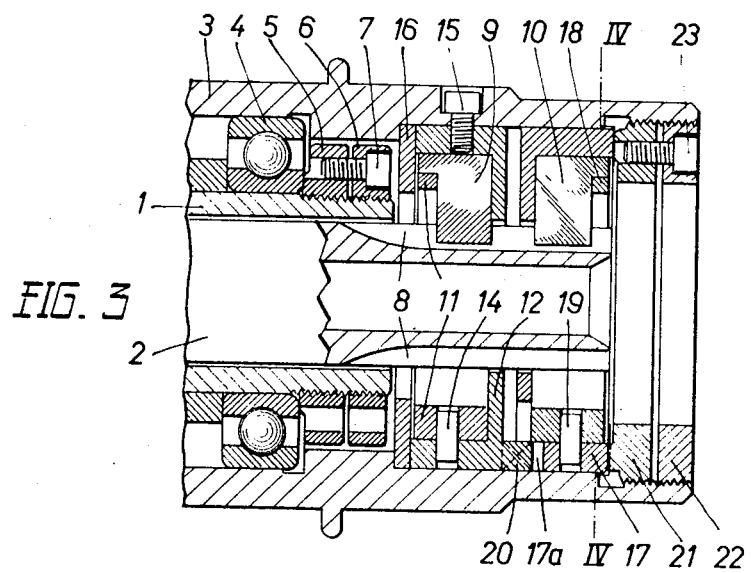
Figure 4:
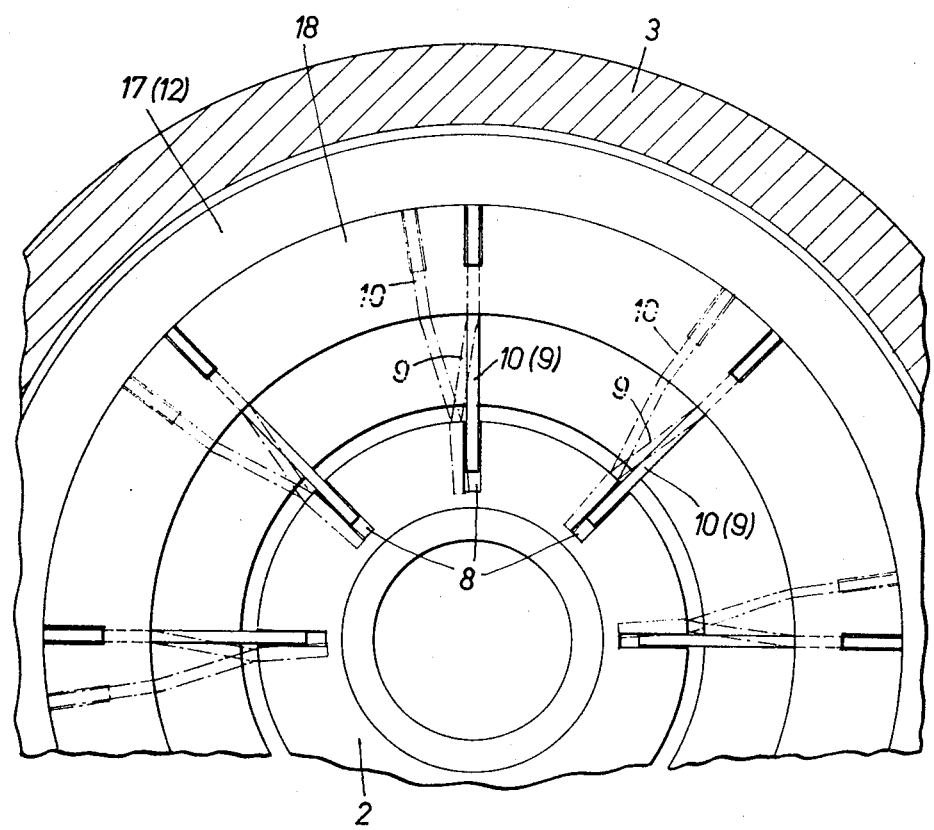

In a first embodiment shown in FIGS. 3 and 4, an elastic coupling comprises a generally cylindrical housing 3, a section of the peripheral surface of which serves as a pulley wheel for a belt (not shown) and constituting a drive input means of the flexible coupling. The housing 3 is borne on a cylindrical support 1 through the intermediary of two sets of bearings, only one set 4 being shown. The two sets of bearings are separated one from another by a spacer ring, bearings 4 being urged against the spacer ring by a pair of rings 5 and 6, screwthreaded onto the end of the support 1. Ring 6 serves as a locking ring for ring 5, the rings being locked one with respect to the other by means of a screw 7. Similar provision is made for locating the set of bearings not shown.

The support 1 is mounted on the body of a machine tool, in this embodiment the hearstock (not shown) of an automatic lathe. A lathe live spindle 2 passes through the bore of the support 1 mounted therein on bearings (not shown). The end of the spindle 2 remote from the lathe projects from the end of the support 1. The projecting end of the spindle 2 is provided with a series of axially extending grooves 8 passing radially into the spindle and evenly spaced circumferentially of the spindle. In the vicinity of the end of the support 1, the housing is provided internally thereof with an annular shoulder which serves to locate a plate 12 provided with a cylindrical flange, a washer 16 being interposed between the flange of the plate 12 and the annular shoulder. The plate 12 is secured to the housing 3 by means of a screw 15 screwthreaded into the flange. Secured internally of the flange of plate 12 by means of key 14 is an annular collar 11. The collar 11 is thus relatively fixed with respect to the housing 3. The collar 11 is provided with radially extending slots passing axially through the whole of one side thereof and through a radially outer portion of the other side, each slot being of inverted "L" form.

A series of spring strip elements 9, each of spring steel laminate construction, are located over the radially outer portion of each, in the slots of the collar 11 and extend radially inwardly to be located over the radially outer portion of each element, in the grooves 8 in the spindle 2. The spring strip elements 9 are each provided with an axially projecting ear such that the radially outer portion of the spring strip elements 9 are of congruous shape to the inverter "L" shape of the slots in collar 11, whereby the elements 9 are anchored in a radially inward sense and in addition in a circumferential sense. In axially spaced apart relation to the plate 12 is disposed a plate 17 of similar form thereto and having a cylindrical flange. An annular collar 18 is located within the flange of the plate 17 by means of a key 19. The collar 18 is provided with radially extending slots in which are located a series of spring strip elements 10. Generally the form of the plate 17, collar 18 and the slots thereof and spring strip elements 10 are similar to that of plate 12, collar 11 and the slots thereof and spring strip elements 9 and their arrangements are mirror images. However, in this instance, plate 17 is freely rotatable within the housing 3.

The bore of the housing 3 at the end thereof shown in FIG. 3 is screwthreaded and accommodates an externally screwthreaded setting ring 21 and locking ring 22. When the axial position of setting ring 21 within the housing 3 is desired to be fixed, screw 23 serves to lock rings 21 and 22 together. The ring 21 abuts the flange of the plate 17 and thus the position of ring 21 determines an axial limiting position of ring 17.

On the end face of plate 12 are axially extending and tapering extension pieces 20, the extension pieces 20 having sloping sides with respect to the longitudinal axis of the coupling. The end face of plate 17 is provided with recesses 17a of congruous shape to that of the extension pieces 20 of plate 12. The extension pieces 20 and recesses 17a are so shaped and arranged that on axial movement of plate 17 towards plate 12, the progressive engagement of extension pieces 20 in recesses 17a causes rotation between the plates 12 and 17 to take place.

In use of the elastic coupling of the first embodiment, the coupling is first set by screwing in setting ring 21 to adjust the relative axial position of plate 17 with respect to plate 12. Progressive engagement of extension pieces 20 of plate 12 and recesses 17a of plate 17 causes relative rotation between plates 12 and 17. In this manner each series of spring strip elements 9 and 10 associated with each ring 12 and 17 respectively become inclined and sprung in disposition with respect to their initial strictly radial and unsprung disposition thereof, one series in an opposite sense with respect to the other. This is shown in FIG. 4 wherein the spring strip elements 9 or 10 in solid line are in the unsprung and strictly radially dispositions wherein the spring strip elements 9 or 10 in broken line are in the sprung and inclined dispositions. It will be appreciated that each spring strip element in the sprung disposition thereof assumes a drawn out "S" form. Having arranged plates 12 and 17 in the desired relative disposition, locking ring 22 is screwed in and locked to setting ring 21 by insertion of a screw 23.

It will be appreciated that by appropriate setting of ring 21, the elasticity constant of the coupling may be set as desired between certain limits. The setting may be adjusted from case to case as convenience demands, e.g. a fixed setting may be provided for use on a certain lathe, or the setting may be adjusted in the case of special work on the lathe. Once set, the coupling is fitted and employed as would be a conventional coupling, belt drive being applied to the housing 3 and transmitted through the coupling to the live spindle 2 of the lathe upon which the workpiece is mounted.

Figure 5:
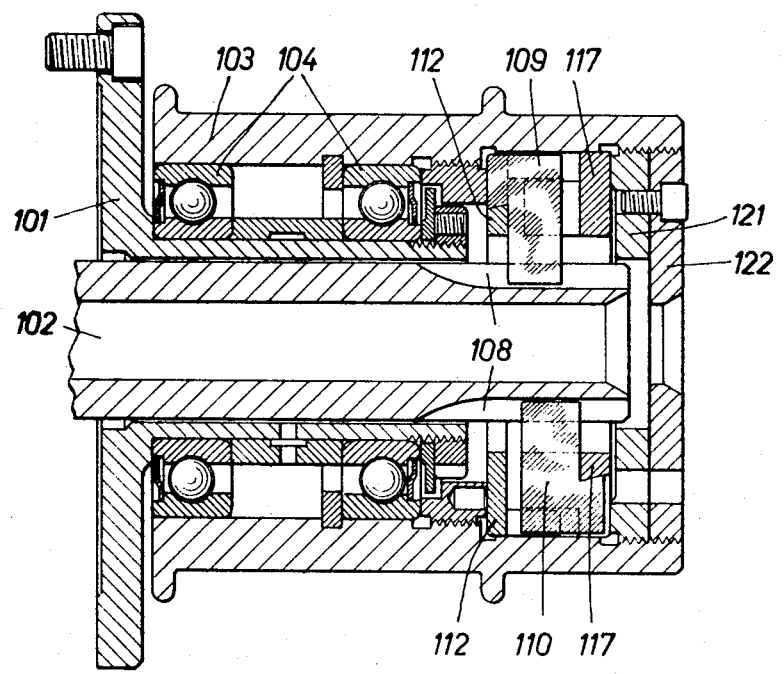
Figure 6:
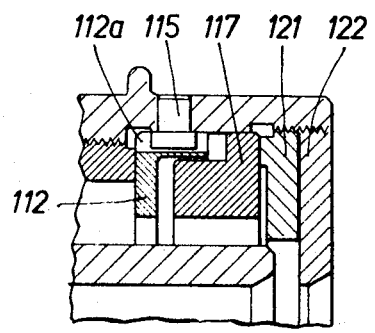

In a second embodiment shown in FIGS. 5, 6 and 7, many components of the coupling are of similar construction and arrangement to that shown and described hereinbefore with respect to the first embodiment. Reference numbers employed in FIGS. 5, 6 and 7 are those employed in FIGS. 3 and 4 to signify similar components but prefixed by one hundred.

Two series of spring strip elements 109 and 110, the radially inner portions being located in axial grooves 108 of a live spindle 102 of a lathe (not shown) are disposed generally radially with their radially outer portions located in radial slots in collars 112 and 117 respectively. The collar 112 is keyed to the housing 103 of the coupling by means of key 115. The collar 117 is rotatable and movable axially within certain limits within the housing 103. In FIG. 7, extension pieces 120 on collar 112 engageable progressively in congruous recesses 117a may be observed. The extension pieces 120 and recesses 117a are not truly aligned and thus on axial movement of collar 117 towards collar 112 one of the inclined sides 120a of the extension piece engages one of the corresponding inclined sides of the recesses 117a causing on further axial movement relative rotation between the two collars. The extent of relative rotation and thus the setting of the elasticity of the coupling is determined and controlled by the position of setting ring 121 and its associated locking 122. It will be appreciated that the collars 112 and 117 are equivalent in effect and function, to the combination of ring 12 and collar 11 and ring 17 and collar 8 respectively of the first embodiment.

In use, the operation and setting of the elastic coupling of this embodiment is analogous to that described with respect to the first embodiment.

Figure 8:
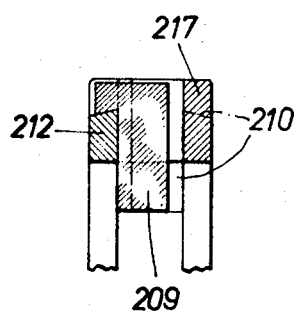

In a modification of the second embodiment shown in FIGS. 8 and 9, similar components are prefixed by two hundered instead of one hundred. The modification relates only to the form of the collars accommodating the upper portions of the spring strip elements, i.e., collars 212 and 217. These collars are of simpler form than their counterparts 112 and 117 respectively of the second embodiment although their function and operation is analogous, as will be observed from the drawings.

Whilst preferred forms of the present invention have been described, changes and modifications may be made therein within the scope of the appended claims without departing from the scope of the invention.

What is claimed is:

1. An elastic coupling suitable for transmitting drive to a machine tool comprising a drive input means, a drive output means, one of said drive means including a pair of annular collars, two series of generally radially extending spring strip elements, one collar anchoring the radially outer portions of the spring strip elements of one series and the other collar anchoring the radially outer portions of the spring strip elements of the other series, said other drive means being adapted to anchor the radially inner portions of the spring strip elements of both series, said spring strip elements being inclined circumferentially to the radius with the spring strip elements of one series being inclined in an opposite sense to the spring strip elements of the other series, said drive input means and said drive out-put means being arranged so that the drive is transmitted through the spring strip elements to tend to cause a change in the inclination thereof to the radius, and means to rotatably adjust one collar with respect to the other collar to vary the inclination of the two series of spring strip elements with respect to each other and thus vary the elasticity constant of the coupling.

2. The coupling of claim 10 wherein one of the annular collars is fixed, the second being controllably movable axially with respect to the first, collar rotation means being provided associated with each collar such that on movement of the second annular collar axially towards the first, said second collar is caused simultaneously to rotate with respect to the first to alter the inclination of the spring strip elements.

3. The coupling of claim 4 wherein said collar rotation means comprises a wedge-shaped extension piece on one collar cooperating with a congruous shaped recess on the other collar, the extension piece being circumferentially offset from the recess.

4. The coupling of claim 10 wherein the radially outer portion of each spring strip element is provided with an axially projecting ear, and each collar is provided with a series of radially extending slots of inverted "L" form to accommodate and anchor the radially outer portions of the spring strip elements including said axially projecting ears.

* * * * *